(12) United States Patent
Uguen et al.

(10) Patent No.: US 8,963,511 B2
(45) Date of Patent: Feb. 24, 2015

(54) CONTROLLER FOR A SWITCHED MODE POWER CONVERTER, A SWITCHED MODE POWER CONVERTER AND METHOD OF CONTROLLING THE SAME

(71) Applicant: NXP B. V., Eindhoven (NL)

(72) Inventors: Emeric Uguen, Domjean (FR); Thibault Perquis, Saint Pierre-du-Bu (FR)

(73) Assignee: NXP B.V., Eindhoven (NL)

( * ) Notice: Subject to any disclaimer, the term of this patent is extended or adjusted under 35 U.S.C. 154(b) by 258 days.

(21) Appl. No.: 13/713,236

(22) Filed: Dec. 13, 2012

(65) Prior Publication Data

US 2013/0188407 A1 Jul. 25, 2013

(30) Foreign Application Priority Data

Dec. 15, 2011 (EP) .................................... 11290579

(51) Int. Cl.
*H02M 1/42* (2007.01)
*H02M 7/04* (2006.01)
*H05B 33/08* (2006.01)

(52) U.S. Cl.
CPC .............. *H02M 7/04* (2013.01); *H02M 1/4258* (2013.01); *H05B 33/0815* (2013.01); *Y02B 70/126* (2013.01)
USPC ............................................ 323/207; 363/44

(58) Field of Classification Search
CPC .... H02M 1/42; H02M 1/4208; H02M 1/4258
USPC ............................................ 323/207; 363/44
See application file for complete search history.

(56) References Cited

U.S. PATENT DOCUMENTS

| 5,034,874 A | 7/1991 | Araki |
| 5,146,398 A | 9/1992 | Vila-Masot et al. |

(Continued)

FOREIGN PATENT DOCUMENTS

| CN | 1047770 A | 12/1990 |
| EP | 763312 A1 | 3/1997 |
| WO | 2010/027276 A1 | 3/2010 |

OTHER PUBLICATIONS

Carwardine, J., et al; "Trends in the Use of Digital Technology for Control and Regulation of Power Supplies"; Int'l Conf on Accelerator & Large Experimental Physics Control Systems—1999; Trieste, Italy (Jan. 1999), pp. 171-175.

(Continued)

*Primary Examiner* — Harry Behm (57) ABSTRACT

A method of controlling a switched mode converter is disclosed in which the switching frequency varies in proportion to the square of the sine of the phase of the input AC supply. Thus the switching frequency is a maximum, and the respective on period of the switch is a minimum, when the mains voltage is a maximum. Conversely, the switching frequency is reduced, and the respective on time of the switch is increased, when the mains voltage is reduced. Such a switching method provides for a high power factor. Implementation by means of a phase locked loop and a comparator may prevent the need for complex circuitry, and may provide for direct use of a digital controller or digital signal processing through a counter output in the phase locked loop.

A controller configured to operate such a method, together with an AC/DC converter embodying such a controller are also disclosed.

10 Claims, 4 Drawing Sheets

(56) References Cited

U.S. PATENT DOCUMENTS

| | | | |
|---|---|---|---|
| 5,301,095 A * | 4/1994 | Teramoto et al. | 363/21.07 |
| 5,604,411 A | 2/1997 | Venkitasubrahmanian et al. | |
| 7,012,413 B1 * | 3/2006 | Ye | 323/284 |
| 7,196,917 B2 * | 3/2007 | O'Loughlin | 363/41 |
| 2001/0036094 A1 | 11/2001 | Strand et al. | |
| 2005/0057237 A1 | 3/2005 | Clavel | |
| 2008/0054874 A1 | 3/2008 | Chandrasekaran et al. | |
| 2009/0310385 A1 | 12/2009 | Maksimovic et al. | |
| 2010/0097829 A1 | 4/2010 | Uno et al. | |
| 2010/0110739 A1 | 5/2010 | Nishikawa | |
| 2010/0315849 A1 | 12/2010 | Ingemi et al. | |
| 2011/0149613 A1 | 6/2011 | Lanni | |
| 2011/0188273 A1 | 8/2011 | Pansier et al. | |
| 2011/0215784 A1 | 9/2011 | Hoogzaad | |
| 2011/0254525 A1 | 10/2011 | Gaknoki et al. | |
| 2012/0020119 A1 * | 1/2012 | Tang et al. | 363/21.02 |
| 2013/0301317 A1 * | 11/2013 | Ishii | 363/44 |

OTHER PUBLICATIONS

Garcia, O., et al., "Power Factor Correction: A Survey"; 32$^{nd}$ Annual IEEE Power Electronics Specialitsts Conference—2001—Vancouver, Canada; IEEE, New York, NY, US; vol. 1; pp. 8-13 (Jun. 17, 2001).

Li, Qian et al., :Light Load Efficiency Improvement for PFC; Energy Conversion Congress and Exposition, 2009; IEEE, Piscataway, NJ, US; pp. 3755-3760 (Sep. 20, 2009).

Hasan, Jaber, et al., "A High-Efficiency Digitally Controlled RGB Driver for LED Pixels"; IEEE Transations on Industry Applications, vol. 47, Issue 6; 3 pages. (Nov.-Dec. 2011).

Extended European Search Report of European Application No. 11290579.9 (Sep. 17, 2012), 7 pages.

\* cited by examiner

CONTROLLER FOR A SWITCHED MODE POWER CONVERTER, A SWITCHED MODE POWER CONVERTER AND METHOD OF CONTROLLING THE SAME

CROSS-REFERENCE TO RELATED APPLICATIONS

This application claims the priority under 35 U.S.C. §119 of European patent application no. 11290579.9, filed on Dec. 15, 2011, the contents of which are incorporated by reference herein.

FIELD OF THE INVENTION

This invention relates to AC-DC switched modes power converters, to controllers therefor, and to methods of controlling switched mode power converters.

BACKGROUND OF THE INVENTION

AC-DC Switched mode power convertors, for converting power from an alternating current source, such as a mains supply, to a direct current (DC) output, are well known. Such converters have been used in domestic environments in particular for several years, for instance to provide power to consumer electronic equipment such as televisions, video players, computers and the like. The recent and growing trend for incandescent lighting to be replaced by energy-efficient lighting such as compact fluorescent lighting or LED-based lighting is anticipated to result in a significant increase in the importance of AC-DC switched mode power converters for domestic applications. With the increasing use of switched mode power converters, has come an increasing scrutiny of their impact on the mains supply.

A measure of the impact of any load on a mains supply is the so-called power factor measurement. The power factor of a load is defined as the ratio of the real power to the root mean square value of the voltage-current product. An entirely real load which draws power smoothly and consistently across the whole of the mains cycle or mains half cycle has a power factor of unity; lower power factor is indicative of either a imaginary load (inductive or capacitive) or un-even drawing of power from the mains. The latter, in particular, can result in distortion of the supply from the ideal AC profile, and is associated with the presence of higher harmonics of the fundamental mains frequency.

United States patent application US20051057237 discloses a power factor controller in which the load and line regulation circutory is separate from one another and in which the line regulation is provided with a modulator in which the switching frequency is inversely proportional to the square of the line voltage.

Switched mode power supplies in general are susceptible to disrupting the mains, and typically have a power factor which is significantly less than unity. The high-frequency switching of switched mode power supplies make them particularly susceptible to low power factors. Moreover, when switch mode power supplies are operated in a relatively low-power mode (such as may be the case for supplying the power to electronic consumer electronic equipment in standby mode, or to an LED lighting circuit which is dimmed), the power factor may often fall lower than an acceptable standard.

In order to maintain a high power factor across a range of operating conditions, some known AC-DC converters are configured to operate in boundary conduction mode with Ton control. In the particular case of a flyback converter, this means the on-time of the switch is predetermined, during which the current in the inductor rises linearly. When the switch is opened, the current falls, as power is transferred to the load; when the current falls to zero (typically at the first valley in a resulting resonance) the switch is re-closed to restart cycle. Although this mode of operation is straightforward to establish, the efficiency is not optimal.

Moreover, in order to provide for more sophisticated control, without a commensurate increase in the number and thus cost of components, there is an increasing trend towards digital control rather than conventional analogue control.

It would be desirable to provide an alternative method of controlling an an AC-DC switched mode power converter which may be operable with high power factor, and is compatible with digital control.

SUMMARY OF THE INVENTION

According to a first aspect of the invention there is provided a controller, for use in an AC-DC switched mode power converter for converting an alternating current supply having a phase $\phi$ relative to a zero-crossing of the alternating current supply and having a switch operable at a switching frequency fs, configured to control the switching frequency such that it is proportional to the square of the sine of the phase, over at least a part of an alternating current half-cycle, which half-cycle commences at zero-crossing of the alternating current supply, with a proportionality constant Fmax, according to:

$$fs(\phi) = F\max * \sin^2(\phi).$$

Such control may provide for a high power factor.

Embodiments comprise a phase locked loop configured to determine the phase. Embodiments further comprise a comparator for determining a zero-crossing of the phase. A phase locked loop together with a single comparator constitutes a particularly convenient and straightforward control method which requires relatively few components and is simple to implement.

In embodiments the controller is a digital controller, although in other embodiments it could be analog. By choosing the controller to be a digital controller, which may also be referred to as a digital signal processor, a high degree of flexibility of control may be provided with a limited overhead of additional components. Furthermore, the phase locked loop and comparator may also be able to function as the analogue to digital converter which may otherwise be required for a digital controller. In particular, an output PHASE of a counter in the phase locked loop may directly provide a digital input to the digital signal processor.

In embodiments the switch is configured to be switched on just until a primary current reaches a predetermined peak value Ipeak.

In embodiments the controller is configured to ensure that the switching frequency does not fall below a limit frequency Fmin, according to the relationship:

$$fs(\phi) = \text{MAX}\{F\max * \sin^2(\phi), F\min\}.$$

Limiting the minimum frequency of the switching to a value which may be for instance above the audible range may avoid or reduce problems of audio interference from the controller. Further, limiting the minimum frequency of the switching may provide for more stable control than might be available for a controller which does not have a minimum switching frequency.

According to another aspect of this invention there is provided an AC-DC power supply comprising a controller as claimed in any preceding claim.

According to another aspect of the invention there is provided a method of controlling an AC-DC switched mode power converter, the switched mode power converter being for converting an alternating current supply having a phase φ relative to a zero-crossing of the alternating current supply and having a switch operable at a switching frequency fs comprising: determining the phase φ by means of a phase locked loop; and controlling the switching frequency over at least a half of an alternating current half-cycle, which half-cycle commences at a zero-crossing of the alternating current supply, according to $$fs(\phi)=F\max*\sin^2(\phi),$$

where Fmax is a maximum switching frequency.

Embodiments comprise controlling the switching frequency to not fall below a limit frequency Fmin. In embodiments, the control is digital.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which

FIG. 2 shows, at FIG. 2(a) the current variation over a typically switching cycle, at FIG. 2(b), a variation of switching frequency with mains phase according to embodiments, and at FIGS. 2(c)-2(e), time-profiles of the state of the converter switch at different points of the mains half cycle;

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

Figure 1:
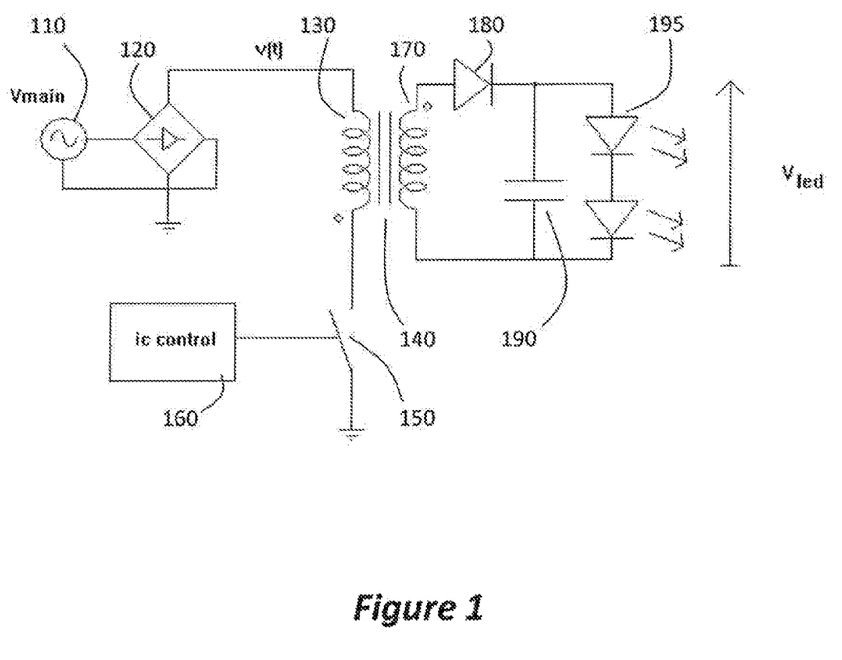
FIG. 1 shows a flyback convertor, arranged to convert a mains AC power supply and provide power to a string of LEDs.

FIG. 1 shows a conventional flyback convertor, arranged to convert a mains AC power supply to DC and provide power to a string of LEDs. Voltage from a mains power supply 110 is rectified by rectifier 120, and applied to the primary side coil 130 of a transformer 140. In series with the primary side coil 130 is a switch 150 which is controlled by means of control 160. The secondary side coil 170 is connected through diode 180 and smoothing output capacitor 190 to the load, which as shown may be a string of LEDs 195.

Such a flyback converter may be operated in discontinuous conduction mode (DCM). In discontinuous conduction mode, the switch 150 is closed for a certain time Ton (which may be predetermined, under "Ton-control", or may be determined from the input conditions, for instance under "Ipeak-control"), during which the current in the coil 130 rises; the rate of increase in the current is dependent on the phase-dependent voltage supplied from the mains, and the inductance of the transformer, and thus may not be accurately known a priori. When the switch 150 is opened at the end of this "on-time", the current in the coil 130 falls. The rate of fall of the current depends on the output circuit, and in particular on the magnitude of the load, in this case the LEDs string 195. The current falls to zero, over a time Tsec. In discontinuous mode, there is then a discontinuity or gap Tgap, before the switch is closed to start the next switching cycle. Within a switching cycle, the switch is thus open for Tsec+Tgap. That is to say, $$T\text{off}=T\text{sec}+T\text{gap}.$$

The total switching time Ts is then given by:

$$Ts=T\text{on}+T\text{off}=T\text{on}+T\text{sec}+T\text{gap}$$

According to embodiments, frequency control of the switch is applied. In particular, the frequency of the switching cycle is made dependant on the phase of the mains cycle, though the relationship:

$$fs(\phi)=F\max*\sin^2(\phi) \quad (1)$$

That is to say, the switching frequency fs at a phase φ varies with the square of the sine of the phase. Thus, the switching frequency has its maximum value Fmax, when the absolute value of the mains voltage is highest. Thus the Ton-period is shortest when the mains voltage is highest, and longest when the mains voltage is lowest or near zero.

The choice of the maximum switching frequency Fmax depends on the specific application, and in particular on the materials used. It depends on switching looses and losses due to other characteristics, In some applications based on CMOS Si switches, 100 kHz, or a value close to 100 kHz has been found to be convenient. However, it is envisaged that for different switch materials, and in particular for wide bandgap materials switches such as GaN or SiC, it may be appropriate to choose a higher value for the maximum switching frequency Fmax.

Figure 2A:
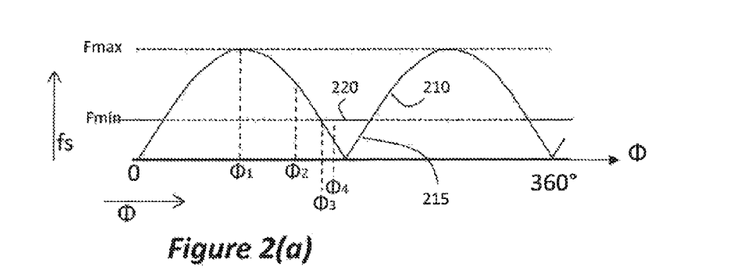

Using frequency control to control the switch, in dependence on the phase of the mains cycle, according to the above equation, may provide for a high power factor. That this is so, will now be shown, with reference to FIG. 2(a), which show the Ton and Toff times for a switching cycle for a flyback converter, operated under peak current control. The converter is operated in discontinuous control mode. During the primary stroke the primary current I1 rises until it reaches the predetermined peak current Ipk according to:

$$Ton = \frac{L*Ipeak}{Vin},$$

where L is inductance, and Vin the voltage (at this moment of the mains cycle). Once (peak is reached, the switch is opened, and the primary current I1 returns immediately to zero. The secondary current I2, starts at a value N·Ipeak, (that is, it depends on the terms ratio N of the transformer), and falls to 0 at a rate dependent on the load. Assume for present explanation that N is unity. The time for the secondary current to fall to zero is the length of the secondary stroke Tsec. There is then a gap Tgap until the switch is turned back on to start another switching cycle.

Since $$\overline{Iin(\Phi)} = \frac{Ipeak}{2} \cdot \frac{Ton}{Ts},$$

thus:

$$\overline{Iin(\Phi)} = L \cdot \frac{Ipeak^2}{2} \cdot Fs \cdot \frac{1}{Vin}.$$

And since Vin=Vin_max·sin(φ), and $$Fs = Fmax \cdot \sin^2(\Phi),$$

then $$\overline{Iin(\Phi)} = L \cdot \frac{Ipeak^2}{2} \cdot \frac{Fmax}{Vin\_max} Fmax \cdot \sin(\phi)$$

or $$\overline{Iin(\phi)} = \left(L \cdot \frac{Ipeak^2}{2} \cdot \frac{Fmax}{Vin\_max^2} Fmax\right) \cdot Vin(\phi)$$

In other words: $\overline{Iin(\phi)} \propto Vin$,

That is to say, the input current is in phase with the input voltage, and thus the power factor is high or even unity.

FIG. 2, shows, at FIG. 2(a), a single switching cycle, as has been explained above.

Figure 2B:
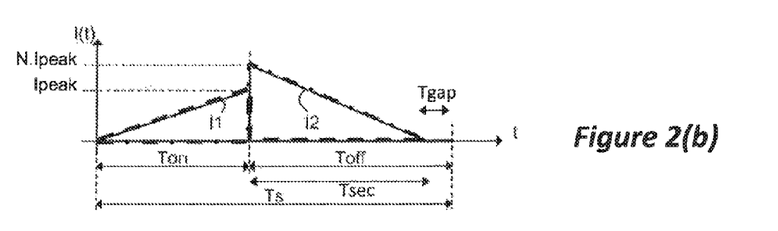
Figure 2C:
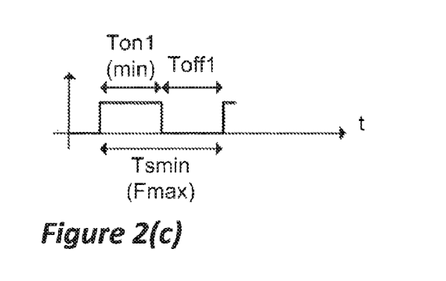
Figure 2D:
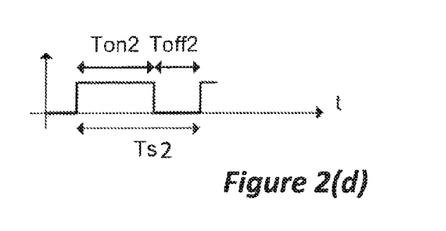
Figure 2E:
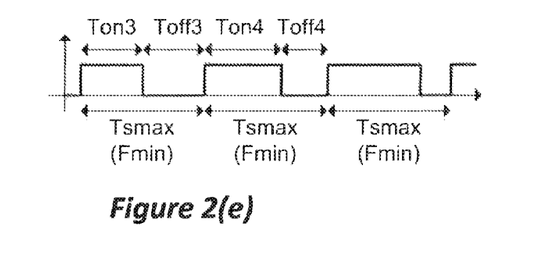

FIG. 2 also shows, at FIG. 2(b), a variation of switching frequency with mains phase according to embodiments, and at FIGS. 2(c)-2(e), time-profiles of the state of the converter switch at different points of the mains half cycle. FIG. 2(b) shows at 210 a plot of switching frequency fs, on the y-axis or ordinate, against the mains phase φ on the X axis or abscissa. The switching frequency fs follows the square of the sine of the phase φ over most of the mains cycle. In particular at 90° and 270°, the frequency fs has its maximum value of Fmax.

As shown in FIG. 2(b), the switching frequency fs may be provided with a lower limit Fmin. Thus, close to 0°, 180° and 360°, that is to say around the zero crossings of the mains phase, the sine-squared curve approaches a minimum as shown by line 215, whereas the switching frequency fs does not fall below its lower limit Fmin at 220. Setting a lower limit fmin may prevent the frequency encroaching into the audible range. A typical value for the lower limit Fmin may thus be 20 kHz.

FIGS. 2(c)-2(e) show time-profiles of the state of the converter switch at different points of the mains half cycle: FIG. 2(c) shows the switching cycle at a moment φ1, which as shown, corresponds to a 90° of 270° phase, when the switching frequency fs is at its maximum value Fmax, since fs=Fmax·sin²(90°)=Fmax. At this moment, Vin has its maximum value, and thus Ton takes its minimum value Ton1. The control system chooses (as will be explained in more detailed hereinbelow) the duration Toff1 of the off time at this moment, such that the total switching period Ts corresponds to the maximum switching frequency Fmax.

FIG. 2(d) shows the switching cycle at a moment φ2, which as shown, corresponds to later moment during the mains phase. Since Ton varies with 1/sin(φ), the value at this moment, Ton2, is greater than Ton1. The control system chooses the duration Toff2 of the off time at this moment, such that the total switching period Ts2=Ton2+Toff2 corresponds to Fmax*{1/sin²(φ)}. Toff2 may be greater or smaller than Toff1, depending on the exact position of φ2 in the mains phase.

FIG. 2(e) shows the switching cycle at moments φ3 and φ4, which as shown, correspond to successively later moments during the mains phase. As shown, φ3 is a moment when the switching frequency has just reached a minimum frequency Fmin (it will be appreciated that the switching frequency cannot approach very close to zero—otherwise the switching period would become excessive, and in the limit the switching time would approach that of the mains cycle time, which is clearly outside of the control scheme). In practice, the minimum switching frequency Fmin may be chosen so as to avoid the switching occurring in the audible range of frequencies, since switching in that range has been known to lead to an audible signal which is generally undesirable and can be particularly irritating for the user.

At moment φ3, the on-time Ton3 is given, as defined above, by:

Ton3=L*Ipeak/{Vin_max*sin(φ)}.

The Toff time is then calculated from

Toff3=1/Fmin−Ton3.

As the phase more closely approaches 180°, Ton will increase, since the input voltage Vin decreases according to Vin=Vin_max*sin(φ) and the on-time is inversely proportional to Vin; however, the switching frequency is held at Fmin, so Ton4>Ton3, and Toff4 is <Toff3.

Figure 3:
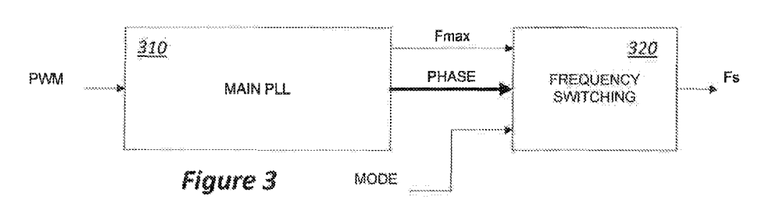
FIG. 3 shows a schematic of a control system according to embodiments.

In embodiments, frequency control is applied to the switch mode power supply in dependence on the phase of the mains supply, and the phase of the mains supply is determined by means of a comparator and a phase locked loop. This is shown schematically in FIG. 3. FIG. 3 shows a main phase locked loop 310 into which is input a pulse width modulated signal PWM. The phase locked loop provides phase information that together with a maximum frequency parameter Fmax to a frequency switching controller 320. Also shown as input into the frequency switching controller 320 is a mode input, which may provide for the frequency is switching controller to change mode such that it operates, for instance, in a constant frequency mode.

The comparator is used to determine the zero crossing of the mains, or more accurately to determine a moment which is indicative of the zero crossing of the mains.

Figure 4:
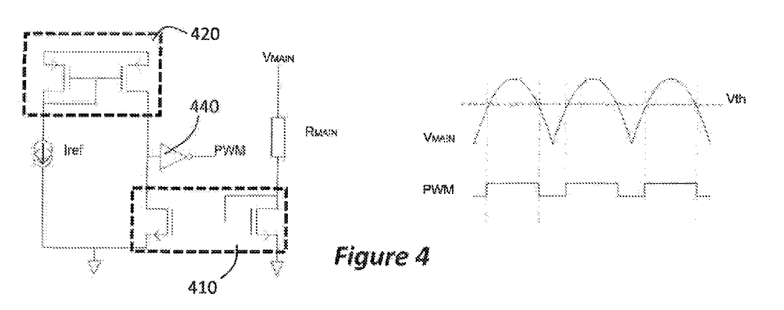
FIG. 4 shows a current comparator for determining a zero crossing.

In general, the comparator may be a current comparator or may be a voltage comparator. An example of a current comparator is shown in FIG. 4. Resistor Rmain is placed across the mains voltage Vmain, and the resulting current is mirrored by first current mirror 410. A reference current Iref is mirrored by a second current mirror 420, and the resulting currents are subtracted. The sign of the resulting current is sensed through inverter 440, resulting in a signal PWM signal which is high provided that the mains voltage is above a threshold level Vth, and is low if the mains voltage is below Vth. The zero crossing of the mains is then the midpoint of the low part of signal PWM.

Figure 5:
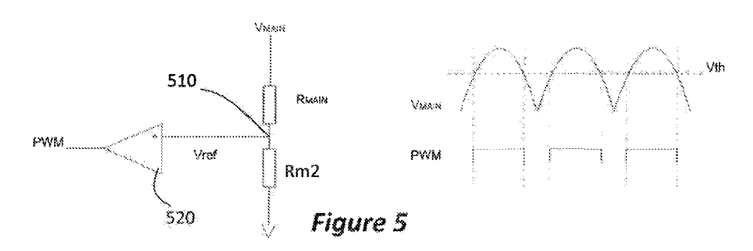
FIG. 5 shows a voltage comparator for determining a zero crossing.

A non-limiting alternative comparator is shown in FIG. 5. This comparator comprises a voltage divider comprising resistors Rmain and Rm2. The node 510 of the voltage divider is provided as the positive input to the comparator 520. The negative input to the comparator is a reference voltage Vref. The output PWM of the comparator 520 is thus high provided that the mains voltage is above some threshold Vth, and is low if the mains voltage is below the threshold Vth. Similarly to the example above, the zero crossing may be determined as the midpoint of the low part of the PWM signal.

Figure 6:
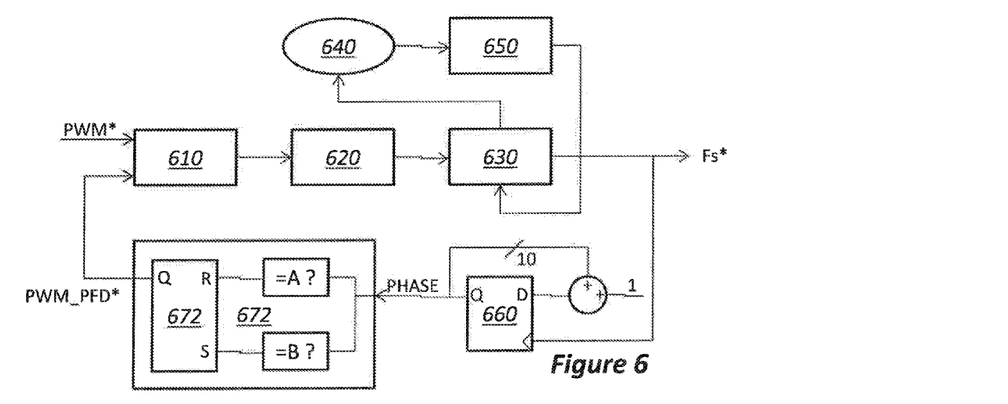
FIG. 6 shows a schematic of a phase locked loop.

FIG. 6 shows a schematic of a phase locked loop, such as may be used in embodiments of the invention. The phase locked loop 600 comprises a phase and frequency detector 610 connected in series with a digital lowpass filter 620 and digital control 630. The digital control may output to a current controlled oscillator 640 which provides an oscillating signal which is input to a prescaler 650. The digital control 630 also provides output to a 10-bit counter 660. The 10-bit counter 660 provides phase information PHASE into a logic block 670 which recreates a pulse width modulated signal PWM_PFD. Logic block 670 includes a set reset flip-flop 672, together with logical comparators 674 and 676 which check for the falling edge and the rising edge of the PWM signal, at moments in time tA and tB respectively, when the phase is φA and φB respectively. Moments tA and tB correspond to the moments when the mains voltage of the main crosses the voltage threshold Vth, that is to say the mains voltage has values VthA and VthB respectively. Of course, it will be appreciated that in the case of a single threshold Vth, the voltage levels VthA and VthB are equal.

The prescaler 650 operates to link the oscillator frequency with that of the mains of the PWM signal. The prescaler divides the frequency Fcco of the oscillator by a factor Ndiv, to achieve the desired maximum operating frequency Fmax. For a mains operating at 50 Hz, that is to say the half-cycle period is 100 Hz, the maximum operating frequency Fmax may be chosen to be equal to 102.4 kHz (i.e. $2^{10} \times 100$ Hz). Alternatively, for a mains operating at 60 Hz, that is to say the half cycle period is 120 Hz, the maximum operating frequency FS may be chosen to be equal to 122.88 kHz (i.e. $2^{10} \times 120$ Hz).

Figure 7:
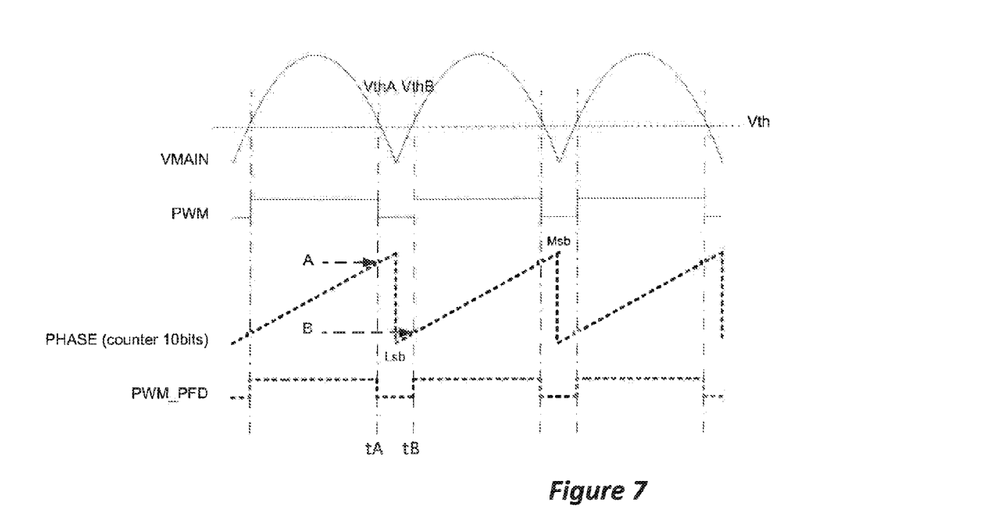
FIG. 7 indicates the operation of the phase locked loop of FIG. 4 configured for use in embodiments.

Operation of this type of phase locked loop will be immediately apparent to the skilled person, and is illustrated by the signals shown in FIG. 7. It will be noted that output from the 10-bit counter 660 rises from zero at the start of the phase, until it reaches $2^{10}$, that is to say 1023, then is reset to zero. The moments tA and tB, at which the counter has values A and B respectively, are used to reconstruct the pulse width modulated signal PWM, as PWM-PFD. When the phase is locked, the reconstructed signal is an exact copy of the original PWM signal.

The relationship between the phase φ at the rising edge tB of the PWM signal, and VthB may be shown to be:

$$\Phi B = \arcsin\left(\frac{VthB}{Vmain}\right) = \frac{B}{1024} * \pi, \quad (2)$$

and that between the phase φ at the falling edge to of the PWM signal, and VthA may be shown to be:

$$\Phi A = \arcsin\left(\frac{VthA}{Amain}\right) = \frac{A}{1024 - B} * \pi, . \quad (3)$$

The output from the 10 bit counter, PHASE, is then related to the phase of the mains supply (or the PWM signal), through:

$$\Phi = \frac{PHASE}{1024} * \pi, . \quad (4)$$

The skilled person will appreciate that other suitable phase locked loop architectures may be used in place of that shown. For example, a voltage controlled oscillator may be used in place of the current controlled oscillator 640.

However, it will be appreciated that the output signal PHASE from the bit counter may be directly used in the frequency switching control, $$fs = F\max * \sin^2(\phi), \quad (5)$$

through:

$$fs = f\max * \sin^2\left(\frac{PHASE}{1024} * \pi\right), . \quad (6)$$

Thus, use of such a phase locked loop provides a particularly convenient method of derived the control parameter PHASE, which may be directly applied in the frequency switching control without the requirement for further components, and in a convenient method which may be compatible with digital signal processing.

It will be appreciated that the invention is not limited to AC-DC power converters operating from a mains supply but may extend, without limitation, to other AC sources.

Further, it will be appreciated that although the above embodiments has been described with reference to a flyback converter, such as that shown in FIG. 1, in order to assist in a clear understanding, the invention is not limited thereto. For example, and without limitation, a buck-boost converter could be used, with the control equations being modified mutatis mutandis.

From reading the present disclosure, other variations and modifications will be apparent to the skilled person. Such variations and modifications may involve equivalent and other features which are already known in the art of switched mode converters, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom. For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A controller for use in an AC-DC switched mode power converter for converting an alternating current supply having a phase $\Phi$ relative to a zero-crossing of the alternating currently supply and having a switch operable at a switching frequency fs, configured to control the switching frequency such that it is proportional to the square of the sine of the phase, over at least a part of an alternating current half-cycle, which half-cycle commences at a zero-crossing of the alternating current supply, with a proportionality constant Fmax, according to:

$$fs(\Phi)=F\text{max}*\sin^2(\Phi).$$

2. A controller according to claim 1, comprising a phase locked loop configured to determine the phase.

3. A controller according to claim 2, further comprising a comparator for determining a zero-crossing of the phase.

4. A controller according to any preceding claim, in which the controller is a digital controller.

5. A controller according to claim 1, wherein the switch is configured to be switched on just until a primary current reaches a predetermined peak value Ipeak.

6. A controller according to claim 1, configured to ensure that the switching frequency does not fall below a limit frequency Fmin, according to the relationship:

$$fs(\Phi)=\text{MAX}\{F\text{max}*\sin^2(\Phi),F\text{min}\}.$$

7. An AC-DC power supply comprising a controller as claimed in claim 1.

8. A method of controlling an AC-DC switched mode power converter, the switched mode power converter being for converting an alternating current supply having a phase $\Phi$ relative to a zero-crossing of the alternating currently supply and having a switch operable at a switching frequency fs the method comprising:
  determining the phase $\Phi$ by means of a phase locked loop;
  controlling the switching frequency over at least a half of an alternating current half-cycle according to $$fs(\Phi)=F\text{max}*\sin^2(\Phi),$$

where Fmax is a maximum switching frequency.

9. The method of claim 8, further comprising
  controlling the switching frequency to not fall below a limit frequency Fmin.

10. The method of claim 8, wherein the control is digital.

* * * * *